United States Patent [19]

Wilwerding

[11] 4,107,520
[45] Aug. 15, 1978

[54] CONTINUOUS FOCUS PROPORTIONAL CONTROLLER

[75] Inventor: Dennis J. Wilwerding, Littleton, Colo.

[73] Assignee: Honeywell Inc., Minneapolis, Minn.

[21] Appl. No.: 804,111

[22] Filed: Jun. 6, 1977

[51] Int. Cl.² .............................................. G01V 1/20
[52] U.S. Cl. ..................................... 250/201; 250/204
[58] Field of Search ....................... 250/201, 204, 209; 356/1, 4, 5; 354/25, 163

[56] References Cited

U.S. PATENT DOCUMENTS

| | | | |
|---|---|---|---|
| 3,764,213 | 10/1973 | O'Meara | 250/204 |
| 3,838,275 | 9/1974 | Stauffer | 250/209 |

*Primary Examiner*—David C. Nelms
*Attorney, Agent, or Firm*—Charles J. Ungemach

[57] ABSTRACT

An automatic continuous focus system of the spatial image correlation type determines whether focus correction is needed and in which direction and moves the lens with a proportional drive in accordance with these determinations.

6 Claims, 11 Drawing Figures

OUTPUT SIGNAL

HOLD CAPACITOR VOLTAGE
CORRELATION SIGNAL
AMPLIFIER SIGNAL

CONTINUOUS FOCUS PROPORTIONAL CONTROLLER

BACKGROUND OF THE INVENTION

The present invention relates generally to apparatus for providing a measure of the distance between the apparatus and an object. In particular, the present invention is directed to automatic focusing systems in which a primary optical means, such as the taking lens of a camera, is moved to maintain an image of the object in focus at the plane of a photographic film.

One highly advantageous type of automatic focus apparatus is the spatial image correlation type. Examples of the different forms of arrangements of this type can be found in copending U.S. patent application Ser. No. 700,963, filed June 29, 1976, by Norman L. Stauffer, and assigned to the same assignee as the present invention; in U.S. Pat. Nos. 3,836,772; 3,838,275; 3,958,117; and 4,002,899; by Norman L. Stauffer, and in U.S. Pat. No. 3,274,914 by K. Biedermann et al.

The typical spatial image correlation apparatus includes two auxiliary optical elements (for example, lenses or mirrors) and two detector arrays. The object distance is determined by moving one of the auxiliary optical elements relative to one of the radiation responsive detector arrays until they occupy a critical or correlation position. This position is a measure of the existing object to apparatus distance.

The relative movement of the auxiliary optical element and the detector array occurs for each distance measuring or focusing operation. The critical condition occurs when there is best correspondence between the radiation distribution of the two auxiliary or detection images formed on the two detector arrays. This condition of best distribution correspondence results in a unique value or effect in the processed electrical output signals. Typically, the correlation signal will contain a major extremum (either a peak or valley) and one or more minor extrema. The major extremum is indicative of the distance to the object.

In most systems, the relative movement of the auxiliary optical element with respect to the detector arrays is achieved by moving a lens or mirror relative to one of the detector arrays. The particular position of the element when best distribution correspondence occurs provides a determination of the existing object of apparatus distance. The position of the auxiliary optical element at the time of best correspondence is used to control the position of the primary optical element, such as the camera taking lens.

In the previously mentioned copending application, Ser. No. 700,963 by Norman L. Stauffer, the correlation signal includes a major peak which is indicative of the distance to an object. A peak detector is used to determine this major peak. A complete scan of all focus zones is provided to insure that the highest correlation is achieved. The location of the last and, therefore, the highest peak detected, corresponds to the desired focus position.

While the arrangement of the Stauffer application Ser. No. 700,963 is generally acceptable, the particular circuit disclosed by Stauffer allows a peak other than the last peak (the correct focus peak) to determine whether focus correction is needed or not.

In my copending application Ser. No. 743,189 filed Nov. 19, 1976, and assigned to the assignee of the present invention, I provide a continuous automatic focus system that overcomes the shortcomings of the prior art and provides an operation which occurs only with respect to the position of the major extremum to produce a focus correction signal and to drive the lens in the appropriate direction to achieve proper focus. While the system disclosed in the application Ser. No. 743,189 is generally satisfactory, some oscillating or hunting may result from the fact that the signal for the drive motor is the same for large focus errors as it is for small focus errors. This can produce some focus oscillation since with large drive signals near the focus position, overshoot is likely to occur. Reducing the speed of the motor drive would reduce such oscillation but would produce a system that might require too much time to achieve a proper focus condition.

SUMMARY OF THE INVENTION

The system of the present invention is a continuous automatic focus system which provides proportional drive, that is, large drive pulses for large focus errors so as to achieve rapid automatic focusing and small drive pulses for small focus errors so that as the system approaches the focus position, the amount of overshoot and focus oscillation is minimized. This is accomplished by providing a signal storage means, such as a capacitor, the voltage upon which is increased in accordance with the amount of focus error which exists. This voltage is converted into a pulse width so as to drive a pulse width modulated motor for refocusing the system. The pulse width is large when there is considerable focus error but becomes small when the motor has driven the lens near the desired focus position. Since the speed of the motor is proportional to the width of the input drive pulse, rapid motion of the lens occurs at large focus errors but slower motion of the lens occurs with small focus errors.

DETAILED DESCRIPTION OF THE PREFERRED EMBODIMENTS

IMAGE CORRELATION RANGE SENSING MEANS

Figure 1:
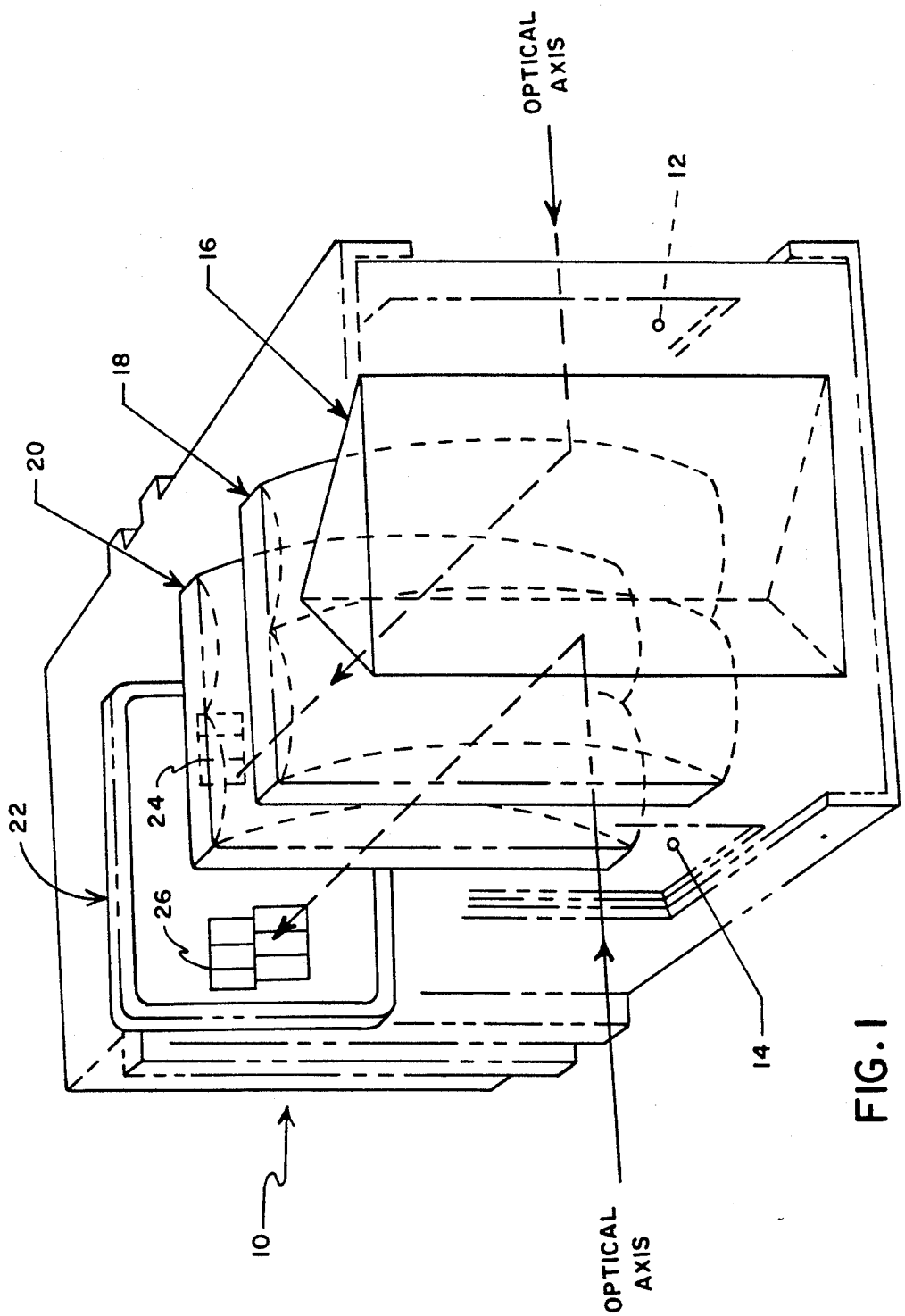
FIG. 1 shows a spatial image correlation range sensing module which may be used in conjunction with the continuous automatic focus system of the present invention.

FIG. 1 shows one particularly advantageous form of image correlation range sensing means which may be used in the continuous automatic focus system. A more detailed description of this modular form of range sensing means may be found in the above-mentioned Stauffer U.S. Pat. No. 4,002,899.

Module 10 of FIG. 1 has two viewing ports, 12 and 14, located on opposite sides. Inside the module is a prism, 16, a twin two-element lens system formed by twin biconvex lens 18 and twin meniscus lens 20, and an integrated circuit 22 including detector arrays 24 and 26 and signal processing circuitry (not shown) connected to the detector arrays. The elements in the module are permanently mounted and require no adjustment or alignment.

Figure 2:
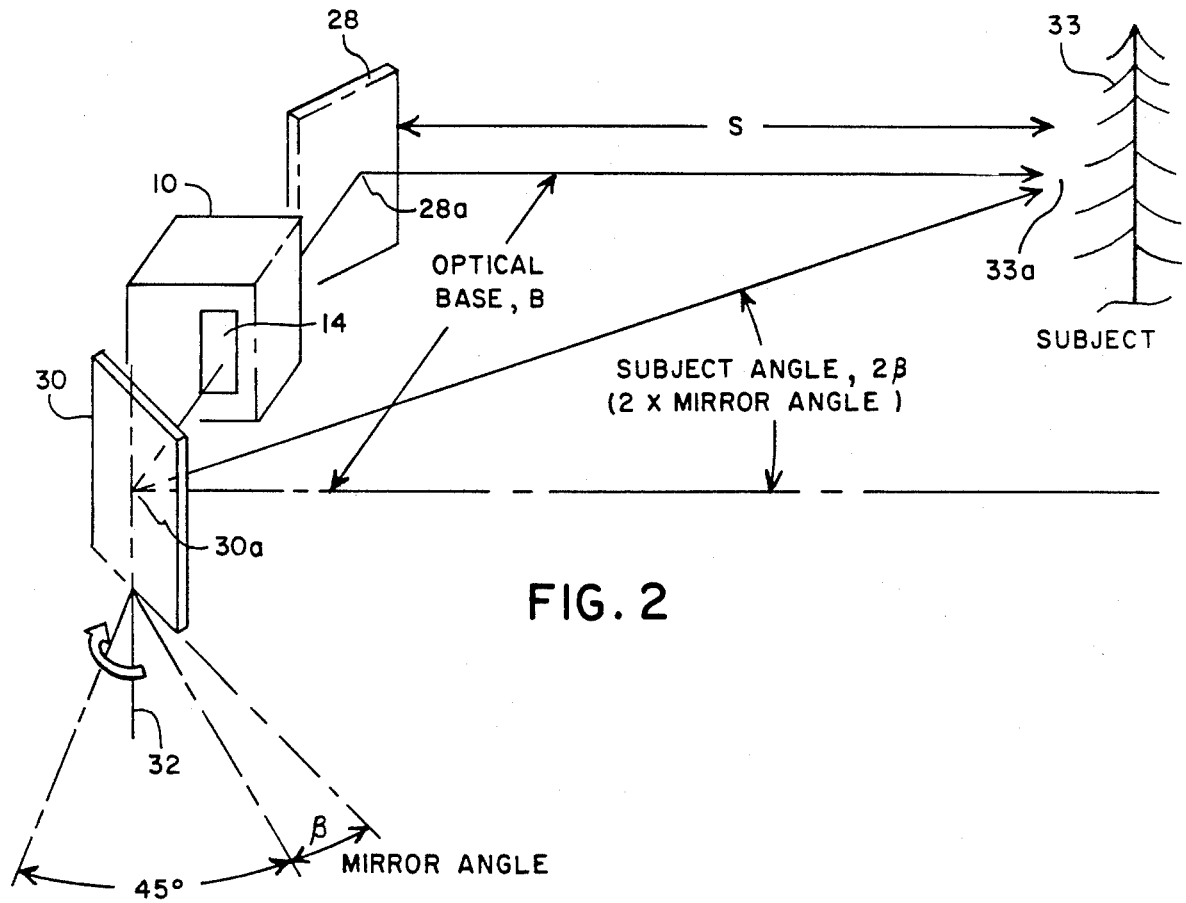
FIG. 2 shows the basic optical configuration of a system using the module of FIG. 1.

To use module 10, two mirrors, 28 and 30, must be positioned so as to direct light from the subject into the two viewing ports. Such a basic system is illustrated in FIG. 2. Mirror 28 provides a fixed view of a portion of the subject field. This portion of the field is imaged within the module 10 onto detector array 24. Mirror 30 is mounted so that it can be rotated about an axis, 32, generally perpendicular to the plane formed by points 28a and 30a on mirrors 28 and 30 and a centralized point 33a on a remote subject 33. Adjustment of mirror 30 allows detector array 26 to view a selected area of the subject field. The light intensity pattern on each array is nearly identical when the subject angle $2\beta$ fulfills the conditions $$\tan (2\beta) = B/S,$$

where $\beta$ is the angle through which mirror 30 is rotated from a 45° position where light from infinity is reflected into viewing port 14. As seen in FIG. 2, angle $2\beta$ is also the angle between a line drawn from point 33a on subject 33 and point 30a on mirror 30, and a line drawn from point 33a on subject 33 and point 28a on mirror 28. B is the length of the base from point 28a on mirror 28 to point 30a on mirror 30, and S is the distance between point 33a on subject 33 and point 28a on mirror 28. This identity is recognized by the correlation electronics of integrated circuit 22 as a major extremum (preferably a peak) in the correlation signal. It should be noted that since the detector arrays 24 and 26 produce signal which vary with the amount of light falling thereon, either of them may also act as a source for a shutter control. In other words, if desired, the exposure of the film may be controlled by utilizing the light responsive signals from detectors in arrays 24 or 26 in place of the usual photocell to close the shutter of a camera utilizing a conventional shutter control system when sufficient light to properly expose the film has been received.

Figure 3:
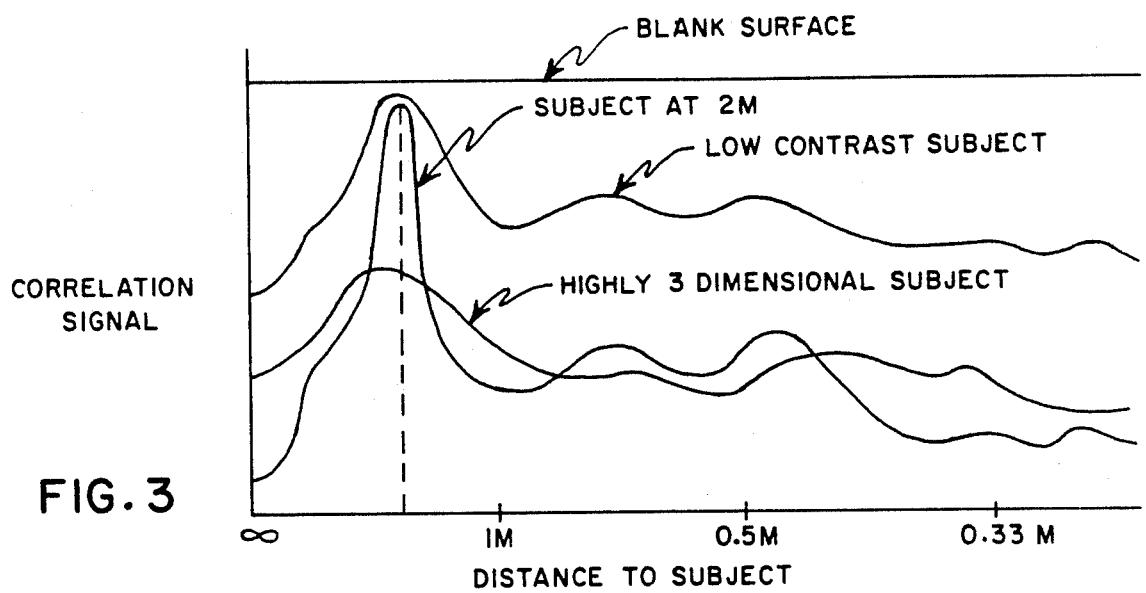
FIG. 3 shows the correlation signal as a function of distance to the subject for several different conditions.

FIG. 3 illustrates the correlation signal as a function of distance to the subject. In FIG. 3, a subject approximately 2 meters distance from the optical system produces a peak output corresponding to that distance, as shown by the curve labelled "subject at 2M." At the infinity position mirrors 28 and 30 are each at 45°, thus directing the optical axis from each into two parallel lines. As movable mirror 30 is adjusted from this position, the correlation signal as illustrated in FIG. 3 is produced. Secondary peaks of lesser amplitude may be present as indicated in FIG. 3. If the optical system views a complete blank surface, devoid of any brightness variations, then the correlation signal will be a constant high level. A very low contrast subject will produce, as indicated, a signal which does not drop very much below peak value at out-of-correlation conditions. A highly three-dimensional subject may not produce as high a peak signal as that produced by a strictly two-dimensional flat scene.

CONTINUOUS AUTOMATIC FOCUS SYSTEMS

The present invention is a continuous automatic focus system which is used in conjunction with spatial image correlation range sensing means. In some situations, for example, in movie and television cameras, continuous focus action is desired. This allows the camera to follow moving objects or to refocus on new subjects as the camera direction is changed.

Figure 4:
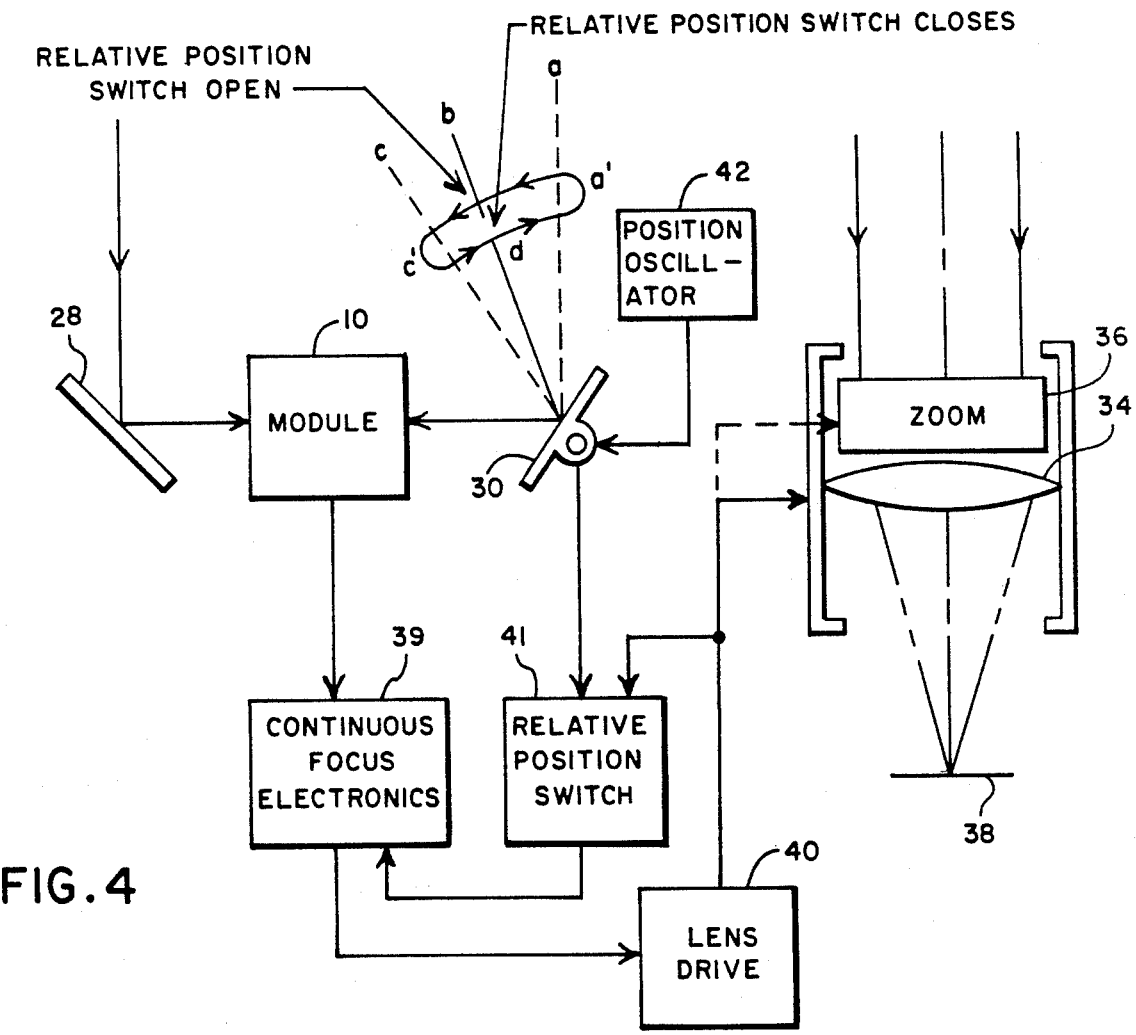
FIG. 4 shows a continuous automatic focus system.

A continuous focus system is shown in basic diagram form in FIG. 4. The system includes module 10, mirrors 28 and 30, taking lens 34, zoom optics 36, film 38, continuous focus control electronics 39, lens drive 40, relative position switch 41, and position oscillator 42.

Scan mirror 30 is provided with a continuous oscillatory motion by position oscillator 42. This motion extends to a position $a'$ beyond infinity and to a position $c'$ somewhat inside of the desired near focus distance.

The opening and closing of relative position switch 41 signals the fact that taking lens 34 and scan mirror 30 are coincidentally looking at, and focused to, the same subject distance. Switch 41 is closed when mirror 30 is in the far field with respect to the position of lens 34 and is open when mirror 30 is in the near field with respect to the position of lens 34. Relative position switch 41 is connected to continuous focus control electronics 39.

Switch 41 may take a variety of different forms, depending on the particular mechanical embodiment of lens drive 40 and position oscillator 42. Examples of relative position switches are shown in the previously mentioned Stauffer application Ser. No. 700,963. Relative position switch 41 must be able to operate for many cycles and should be capable of factory adjustment to permit system alignment.

PEAK DETECTION AND PRODUCTION OF THE OUTPUT SIGNAL

Figure 5:
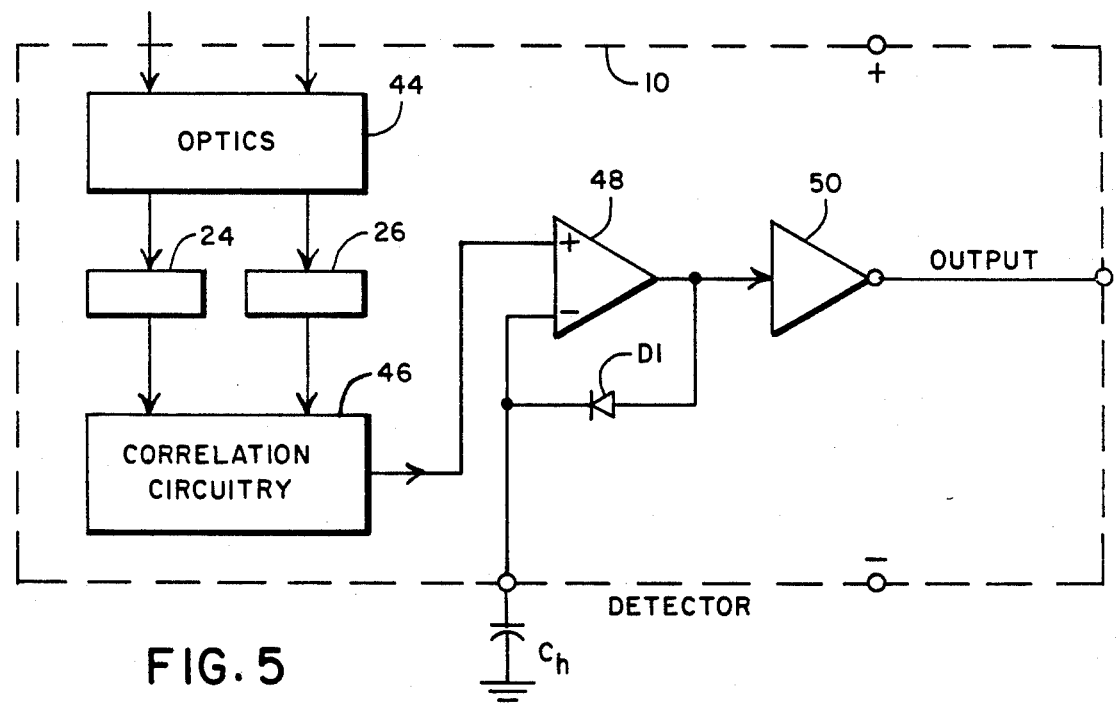
FIG. 5 shows the peak detection circuitry associated with the module of FIG. 1.

FIG. 5 shows module 10 as it is used in preferred embodiment of the present invention. Module 10 includes optics (generally designated by numeral 44) for forming two images, two detector arrays, 24 and 26, and correlation circuitry 46 for producing an analog correlation signal proportional to the degree of correlation of the respective optical images. The correlation signal increases positively with increasing correlation.

Extremum sensing circuitry is provided in module 10 to process the correlation signal to determine when the major correlation extremum occurs. In the preferred embodiment shown in FIG. 5, the major extremum is a peak and the extremum sensing circuitry is peak detection circuitry. This circuitry includes differential amplifier 48, diode D1, inverter 50, and hold capacitor $C_h$. In the embodiment shown in FIG. 5, capacitor $C_h$ is external and is connected to the "Detector" terminal of module 10. Module 10 develops, at the terminal entitled "output" a digital positive going output or auto focus signal at correlation maxima capable of operating external circuitry to stop the camera lens at the proper focus position. It is this change of state of the output signal and not the output signal level, which is indicative of the occurrence of a focus peak.

Figure 6B:
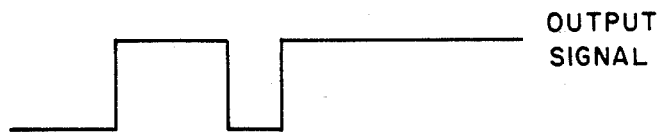
FIGS. 6a and 6b show an example of the hold capacitor voltage, correlation signal amplifier signal, and output signal produced by the module of FIGS. 1 and 5.
Figure 6A:
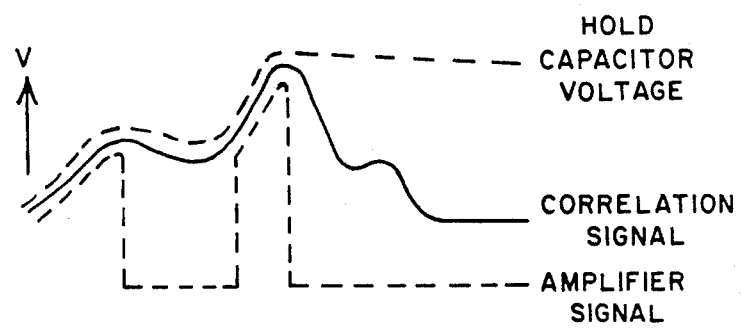

Hold capacitor $C_h$ connected to the "Detector" terminal provides a hold or comparison signal for the peak detection circuitry and to a large extent controls the sensitivity, and overall characteristics of the focus system. Differential amplifier 48 compares the correlation signal with the voltage stored on hold capacitor $C_h$. As the correlation signal rises in voltage, the output of amplifier 48 rises in voltage with it, charging capacitor $C_h$ through feedback diode D1 connected between the output and inverting input. This causes the inverting input to follow the non-inverting input so that the voltage on capacitor $C_h$ is equal to the correlation signal voltage during that portion of time when the correlation signal is rising. Once the correlation signal reaches its peak value and begins to decrease, the voltage on the hold capacitor $C_h$ cannot decrease because of the decoupling of feedback diode D1. Consequently, the output voltage of amplifier 48 falls immediately to negative supply potential. This rapid decrease in the amplifier signal is indicative of a correlation or major peak having occurred. The amplifier signal following a complex correlation waveform is shown in FIG. 6a. FIG. 6b shows the output signal from module 10 produced for the scan of FIG. 6a.

During the scan shown in FIGS. 6a and 6b, the amplifier signal follows the input correlation signal until the first minor peak is reached, at which time the signal drops to negative supply. The amplifier signal begins to rise again when the correlation signal achieves the value equal to the first minor peak and continues to rise until the major peak or correlation peak is found. At this point, the amplifier signal again drops to negative supply and remains in that state until the end of the scan. The last transition of the output signal from "0" to "1", therefore, represents the occurrence of the major peak.

CONTINUOUS FOCUS CONTROL ELECTRONICS

The last positive logic "0" to "1" transition in the output or autofocus signal indicates that a correlation peak has occurred. The continuous focus control electronics uses this signal transition to develop a control signal capable of moving the camera lens to the proper focus position by operation of lens drive means.

Figure 7:
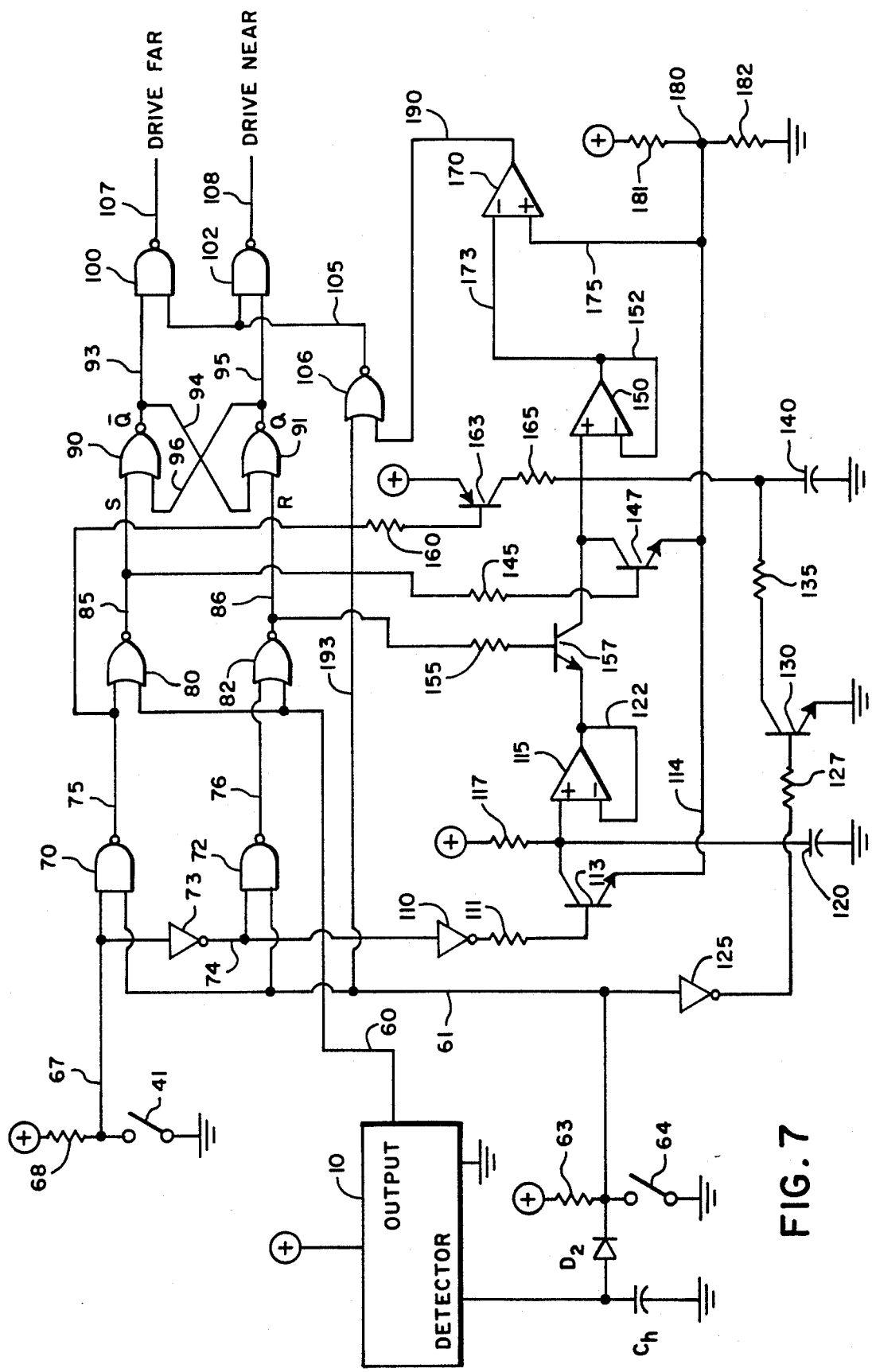
FIG. 7 is a schematic diagram of the continuous focus control electronics of the present invention.

FIG. 7 shows a schematic diagram of the preferred embodiment of the continuous automatic focus proportional control electronics of the present invention. On the left hand side of FIG. 7, the module 10 is shown having its output terminal connected to a conductor 60 and its detector terminal connected through a diode D2 to a conductor 61. The hold capacitor $C_h$ is shown connected between the detector terminal and ground, a resistor 63 is shown connected between conductor 61 and the source of supply voltage and sync switch 64 which is preferably a mechanical switch connected to the scanning mirror and which is open during the near to far portion of the drive and closed on the return half of the drive is shown in an open position connected between conductor 61 and ground. Shown in the upper left hand portion of FIG. 7, the relative position switch 41 is shown connected between a conductor 67 and ground. A resistor 68 is shown connected between conductor 67 and the source of supply voltage. With relative position switch 41 and sync switch 64 in their open position, a positive signal or logical "1" will exist on lines 67 and 61, respectively, while closure of relative position switch 41 and sync switch 64 will produce ground or logical "0" signals on these lines respectively.

A NAND gate 70 is shown in FIG. 7 having one of its input terminals connected to conductor 67 and the other of its input terminals connected to conductor 61. A NAND gate 72 has one of its input terminals connected through an inverter 73 to conductor 67 and the other of its input terminals connected to conductor 61. The outputs of NAND gates 70 and 72 are connected to conductors 75 and 76, respectively.

A first NOR gate 80 is shown having the first of its inputs connected to conductor 75 and a second of its inputs connected to conductor 60. A second NOR gate 82 is shown having the first of its inputs connected to conductor 76 and the second of its inputs connected to the conductor 60. Conductor 60 presents the output or autofocus signal from module 10 to the other of the input terminals of NOR gates 80 and 82. The outputs of NOR gates 80 and 82 are connected to conductors 85 and 86, respectively.

An RS flip-flop or latch circuit formed by a pair of NOR gates 90 and 91 has a set input S connected to conductor 85 and a reset input R connected to conductor 86. The output of NOR gate 90 which is the $\overline{Q}$ output of the RS flip-flop is connected to a conductor 93 and also by a conductor 94 to the other input of NOR gate 91. The output of NOR gate 91 which is the Q output of the RS flip-flop is connected to a conductor 95 and also by a conductor 96 to the other input of NOR gate 90. The RS flip-flop formed by NOR gates 90 and 91 stores the focus correction direction information as will be explained later in detail.

A NAND gate 100 is shown having a first input connected to conductor 93 and a NAND gate 102 is shown having a first input connected to conductor 95. The other inputs of NAND gates 100 and 102 are connected by a conductor 105 to the output of a NOR gate 106. The output of NAND gate 100 is connected to a conductor 107 and a logical "0" signal thereon will cause the servo motor to drive the lens of the autofocus system towards the far field. The output of NAND gate 102 appears on a conductor 108 and a "0" signal thereon will cause the servo motor to drive the lens of the autofocus system towards the near field. Operation of the servo motor drive system will be explained later in connection with FIG. 10.

The output of inverter 73 appearing on conductor 74 is passed through an inverter 110 and a resistor 111 to the base terminal of an NPN transistor 113 having its emitter connected to a conductor 114. The collector of transistor 113 is connected to the non-inverting input of an OP AMP 115, through a resistor 117 to the source of supply voltage and through a capacitor 120 to ground. The output of OP AMP 115 is connected to the inverting terminal thereof by a conductor 122.

Conductor 61 is connected through an inverter 125 and a resistor 127 to the base terminal of an NPN transistor 130. The emitter of transistor 130 is connected to ground and the collector is connected through a resistor 135 to one terminal of a capacitor 140 having its other terminal connected to ground. Capacitor 140 operates as a signal storage means which holds a charge the magnitude of which is indicative of the amount of focus error as will be later explained in detail.

The output from NOR gate 80 appearing on conductor 85 is connected through a resistor 145 to the base of an NPN transistor 147 having its emitter connected to conductor 114. The collector of transistor 147 is connected to the non-inverting input of an OP AMP 150, the output of which is connected to the inverting input by a conductor 152. The collector of transistor 147 is also connected to the junction between resistor 135 and capacitor 140.

The output of NOR gate 82 appearing on conductor 86 is connected through a resistor 155 to the base of an NPN transistor 157. The emitter of transistor 157 is connected to the output of OP AMP 115 and the collector of transistor 157 is connected to the collector of transistor 147, the junction between resistor 135 and capacitor 140 and the non-inverting input of OP AMP 150.

The output of NAND gate 70 appearing on conductor 75 is connected through a resistor 160 to the base of a PNP transistor 163 having its emitter connected to the supply voltage and having its collector connected through a resistor 165 to the junction of resistor 135 and capacitor 140, to the collectors of transistors 147 and 157 and the non-inverting input of OP AMP 150.

An OP AMP 170, which is connected to be used as a comparator, has its inverting input connected by a conductor 173 to the output of OP AMP 150 and has its non-inverting input connected by a conductor 175 to the conductor 114. Conductor 114 is shown connected to a junction point 180 between a resistor 181 and resistor 182. The other terminal of resistor 181 is connected to the supply voltage and the other terminal of resistor 182 is connected to ground. The voltage on junction 180 is a reference voltage which preferably is chosen at approximately half of the supply voltage so as to maintain a nearly linear charge and discharge rate for small errors and so as to insure the operational amplifiers are in the linear range of operation.

The output of OP AMP 170 is shown on a conductor 190 connected to a first of the inputs of NOR gate 106. The second input of NOR gate 106 is connected by a conductor 193 to conductor 61, which receives the sync switch signal from sync switch 64.

Figure 8:
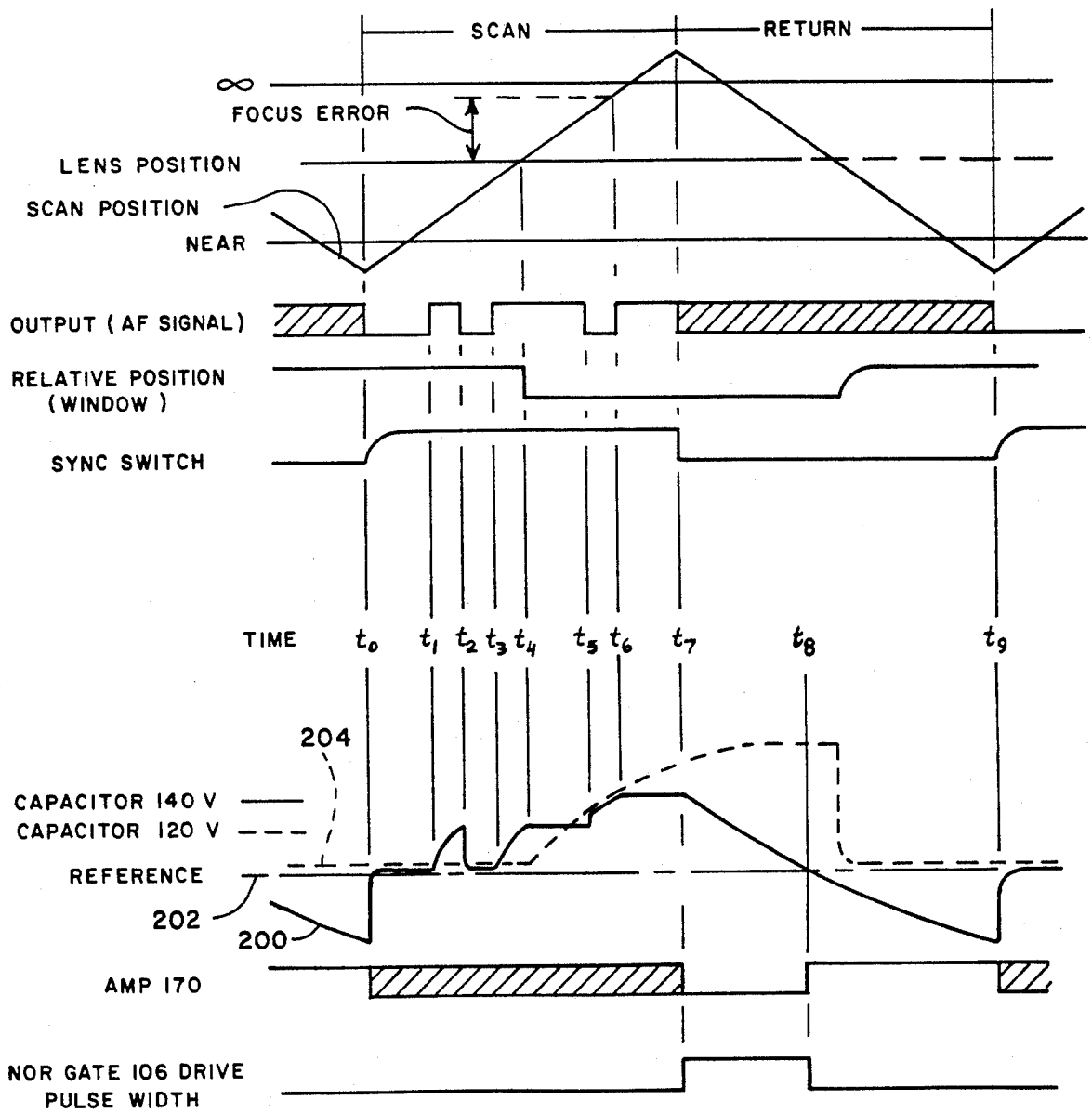
FIG. 8 shows waveforms associated with the operation of the system of FIG. 7.

The operation of the system of FIG. 7 is illustrated by the signal wave form shown in FIG. 8. In FIG. 8, the top wave form shows the position of the lens and the scanning mirror during a complete scanning cycle. The mirror scans from its near limit position to its far limit position, or infinity position, during a first part of the cycle and a return scan of the mirror from far to near completes the cycle. A small amount of overshoot on both ends of the cycle assures that the complete field is scanned during each cycle. In the system of the present invention, only the events that occur during the scan from near to far are used to determine the positioning of the lens.

The output or autofocus signal (AF signal) of module 10 has a logic "0" level whenever a peak is being approached. The transistion from "0" to "1" indicates that a peak has been encountered. The last transition from "0" to "1" indicates the position of the major peak in the correlation signal. If the output signal is still "0" at the end of the near to far scan, it means that the correlation signal was still arising and the correct focus position is at infinity. Portions of the output signal which are cross-hatched indicate that it does not make any difference what the signal is in those areas.

Relative position (window) switch 41 is open when the mirror position is in the near field with respect to the lens position and is closed when the mirror position is in the far field position with respect to the lens position. As seen in FIG. 8, this produces a logical "1" in the near field and when the lens and mirror positions correspond, the relative position switch changes state to produce a logical "0" in the far field.

FIG. 8 also shows that during the near to far scan, when the sync switch 64 is open, a logical "1" signal is produced and during the return scan, when sync switch 64 is closed, a logical "0" signal results.

Referring now to FIG. 7 and FIG. 8, it is seen that shortly after the beginning of the first scan at time t0, the output signal on conductor 60 is a "0", the relative position signal on conductor 67 is a "1", and the sync switch output on line 61 is a "1". Under these circumstances, both inputs to NAND gate 70 are "1"s thus producing a "0" on conductor 75 and through resistor 160 to the base of transistor 163, thus causing transistor 163 to become conductive. This permits a charging of capacitor 140 from the supply voltage through resistor 165. Meanwhile, NOR gate 80 has a pair of "0"s on its input terminals thus producing a "1" on conductor 85 and through resistor 145 to the base of transistor 147, thereby placing transistor 147 in a conducting state. This permits capacitor 140 to charge up only to the level of the reference voltage which exists on terminal 180 since the emitter of transistor 147 is connected thereto. The charge on capacitor 140 is seen by the solid line 200 in the lower portion of FIG. 8 moving up to the reference voltage which is depicted by a dot-dash line 202.

Meanwhile, the "1" signal on line 67 is inverted by inverter 73 so that a "0" signal appears on line 74 and forms one input to NAND gate 72. The other input to NAND gate 72 is connected to line 61 which, as mentioned, is a "1" shortly after time t0. With a "1" and an "0" as inputs, the output of NAND gate 72 is a "1" on line 76 and this forms one input to NOR gate 82, the other input of which is the "0" input from line 60. With a "0" and a "1" as inputs, the output of NOR gate 82 is a "0" and this signal is presented through resistor 155 to the base of transistor 157, thereby causing it to be in an off condition.

It can also be seen that the "0" which exists on line 74 is inverted by inverter 110 to become a "1" which is passed through resistor 111 to the base of transistor 113, thereby causing it to be in a conducting condition and making the voltage across capacitor 120 approximately equal to the reference voltage at terminal 180, as is seen by the dashed line 204 in the middle part of FIG. 8.

Finally, the "1" signal on line 61 is inverted by inverter 125 to a "0" signal which is fed through resistor 127 to the base of transistor 130, thereby causing it to be in a nonconducting state.

It should be noted that the input to NOR gate 106 is a "1" derived from the sync switch signal on line 61 and, accordingly, regardless of changes in the output of OP AMP 170 along conductor 190, the output from NOR gate 106 on line 105 during the entire near to far scan will be a "0". Since this "0" signal on line 105 appears as one input to the NAND gates 100 and 102, the outputs on lines 107 and 108, respectively, will remain "1"s during the near to far scans and the lens positioning motor will not drive in either direction.

It should also be noted that there is a "1" signal on the set terminal of the NOR gate 90 in the latch circuit and a "0" signal on the reset terminal of NOR gate 91, thus producing a "0" signal at the $\bar{Q}$ output on line 93 and a "1" signal at the Q output on line 95, which situation will remain at least until relative position switch 41 is closed. In effect, the latch circuit or RS flip-flop consisting of NOR gates 90 and 91 operates as a memory indicating in which direction the drive will have to occur when the lens positioning motor starts.

At time t1 the output or auto focus signal on conductor 60 changes from a "0" to a "1" level showing that a peak in the correlation signal has just been passed. The sync switch 64 and the relative position switch 41 continue producing "1"'s on lines 61 and 67, respectively. NAND gate 70 will continue to have a "0" output so that transistor 163 will continue to be conducting. The lower input NOR gate 80, however, will now change to a "1" and with a "0" and a "1" as inputs, NOR gate 80 will now produce a "0" on conductor 85 thus turning transistor 147 off. The effect of this is to remove the connection between the upper terminal of capacitor 140 and the reference voltage at terminal 180 and thus permit capacitor 140 to charge up from the supply voltage through transistor 163 and resistor 165 to a voltage higher than the reference potential.

It should be noticed that although the lower terminal of NOR gate 82 now receives a "1", its output will remain "0" and thus transistor 157 will remain off. It should also be noticed that the change in output or auto focus signal to a "1" has no effect on the condition of transistor 113 in its conducting state or of transistor 130 in its off condition. Likewise, although the input to the upper terminal of NOR gate 90 in the latch circuit has changed to a "0", the output on conductor 93 remains a "0" while the output on conductor 95 remains a "1".

The next occurrence in FIG. 8 is a return of the output or auto focus signal from a "1" to a "0" condition at time t2 indicating that a peak higher than the previous one is approaching. This reestablishes the situation which was in existence shortly after the time t0. The only change is the output of NOR gate 80 on line 85 from a "0" to a "1" which turns transistor 147 back on and brings the voltage across capacitor 140 back to the reference potential at junction 180. All other portions of the circuit remain unchanged.

The next event which occurs is the re-return of the output signal on line 60 to a "1" condition at time t3 showing the higher peak in the correlation signal has just been passed. This has the same effect it had at time t1 of turning transistor 147 off and thereby permitting the voltage across capacitor 140 to be charged from the supply voltage through transistor 163 and resistor 165 to a value higher than the reference voltage at junction 180.

At time t4, the mirror has moved from the near position towards the far position by an amount sufficient to cause it to cross the lens position with the result that the relative position switch 41 closes and the signal on line 67 becomes a "0". The output signal on line 60 and the sync signal on line 61 remain unchanged at "1"'s.

The effect of a "0" signal on line 67 is to change the output of NAND gate 70 to a "1". This signal passes through resistor 160 to the base of transistor 163 thereby shutting the transistor 163 off. The output of NOR gate 80 does not change, however, and, accordingly, transistor 147 remains in an off state.

Since it cannot discharge through transistor 147 and remembering that transistor 130 is off as long as sync switch 64 is open, capacitor 140 holds the voltage that was across it at the beginning of time t4 with only minor leakage.

The change from a "1" to a "0" on line 67 is inverted by inverter 73 so that a "1" now appears on conductor 74 which, combined with a "1" signal on line 61 from sync switch 64, causes NAND gate 72 to produce a "0" output. However, since the output signal on line 60 has not changed from its "1" condition, the output of NOR gate 82 remains a "0". Thus, the input to the reset terminal of NOR gate 91 of the latch circuit remains unchanged and transistor 157 remains in its off condition.

The "1" signal on line 74 is inverted by inverter 110 so that "0" signal is presented through resistor 111 to the base of transistor 113, thereby turning transistor 113 off. This allows capacitor 120 to be charged from the supply voltage through resistor 117 to a level higher than the reference voltage at terminal 180. Capacitor 120 will continue to charge in this manner for as long as the relative position or window switch 41 remains in a closed condition.

At time t5, the output signal again changes from a "1" to a "0" state indicating that yet another and higher peak in the correlation signal is approaching. This causes a "0" signal on the lower terminals of NOR gates 80 and 82 while the relative position or window signal on line 67 remains a "0" and the sync signal on line 61 remains a "1" so that circuit components connected solely to these lines are not effected.

The only output that changes at time t5 is the output from NOR gate 82, which now finds itself with two "0"'s on its input terminals. Accordingly, a "1" appears on line 86 which, operating through resistor 155 to the base of transistor 157, causes transistor 157 to become conducting. The effect of this is to allow capacitor 120 to charge capacitor 140 through OP AMP 115 and transistor 157. Accordingly, the voltage on capacitor 140 rises along with the voltage on capacitor 120 as can be seen in the curves in the middle portion of FIG. 8.

Additionally, a "1" on line 86 forces NOR gate 91 output to a "0" state causing the RS flip-flop to change states indicating a focus correlation toward infinity is required.

At time t6 the output or auto focus signal again changes from a "0" to a "1" state for the last time in the scan, thus indicating that the largest peak in the correlation signal has occurred. At time t6 the signal on line 60 thus changes back from a "0" to a "1", the only effect of which is to change the output of NOR gate 82 back to a "0", thus turning transistor 157 off and preventing further charging of capacitor 140 from capacitor 120. Since transistors 163 and 147 are still in their off condition, the charge on capacitor 140 is held with only minor leakage and its voltage continues without further change.

At time t7, which represent the end of the scan from near to far, sync switch 64 closes with the result that the signal on line 61 changes from a "1" to a "0". Although the lower input to NAND gate 70 is now a "0", the output on line 75 remains a "1" and so transistors 163 and 147 remain in an off condition.

The change from a "1" to a "0" on the lower terminal of NAND gate 72 causes the output on line 76 to change from a "0" to a "1", but NOR gate 82's output will remain unchanged at a "0" and transistor 157 will remain off.

One principal effect that the change on line 61 from a "1" to a "0" produces is that the output of inverter 125 will now change to a "1" which, operating through resistor 127, will turn transistor 130 to a conducting state and will allow capacitor 140 to discharge through resistor 135 and transistor 130 to ground. This will occur at a rate dependent upon the size of capacitor 140 and resistor 135 and as seen in FIG. 8, a decay from the voltage being held by capacitor 140 down to the reference voltage occurs between times 57 and t8.

Throughout the entire cycle so far discussed, OP AMP 150 has been presenting the voltage that is on capacitor 140 to the inverting input of OP AMP 170 which, as mentioned, is connected to operate as a comparator. The output of OP AMP 170 will be near ground potential for voltages on capacitor 140 that are in excess of the reference voltage and near supply potential for voltages on capacitor 140 below the reference voltage. During the cycle above described up to time t7, the output of OP AMP 170 has been irrelevant, as shown by the crosshatched portion of the penultimate curve in FIG. 8 because the signal on lines 61 and 193 have remained a "1". Now, however, with the signal on lines 61 and 193 becoming a "0", a "0" signal on conductor 190 causes NOR gate 106 to produce a "1" on line 105 to the inputs of NAND gates 100 and 102. It will be recalled that the signals on lines 93 and 95 changed from a "0" to a "1" to a "1" an a "0", respectively, when the relative position or window switch 41 was closed and line 60 was a "0" at time t5. Accordingly, when a "1" signal appears on line 105, there will be a "1" and a "0" input to NAND gat 102 but both inputs to NAND gate 100 will be "1"'s thus causing the output on line 107 to become a "0". This causes the "drive far" operation of the motor which begins to move the lens away from its present position more into the far field towards infinity where the correct focus position exists. Had the last peak occurred in the near field, the outputs of NOR gate 90 and 91 would still have been "0" and "1", respectively, and the output of NAND gate 102 on line 108 would have become a "0", thereby causing a "drive near" operation.

At time t8, the voltage on capacitor 140 has decayed to the reference voltage and the output of OP AMP 170 will switch to a near supply voltage or "1" level. At this time, the output of NOR gate 106 will again become a "0" and no further driving impetus will be imparted to the motor. Transistor 130 remains in an on condition, however, so that the voltage on capacitor 140 further decays back to its original starting value at which time sync switch 64 will again open and the cycle described above will begin anew.

It is seen that the width of the pulse which drives the motor, ie, the period between times t7 and t8 as seen on the last curve of FIG. 8, is dependent upon the magnitude of the voltage which exist on capacitor 140 at time t7 and upon the rate of decay of that voltage through resistor 135 and transistor 130. This may be adjusted as will be explained in connection with FIG. 9.

Several of the above cycles will normally be required in order to bring the taking lens into the correct focus position but with the speed of operation of the drive, the entire focus operation will occur rapidly, even when it is necesary to move the lens the full distance from one extreme to the other.

During the repeated cycles of operation, the drive servo motor will be driven at speed which vary with the width of the drive pulse.

Figure 9:
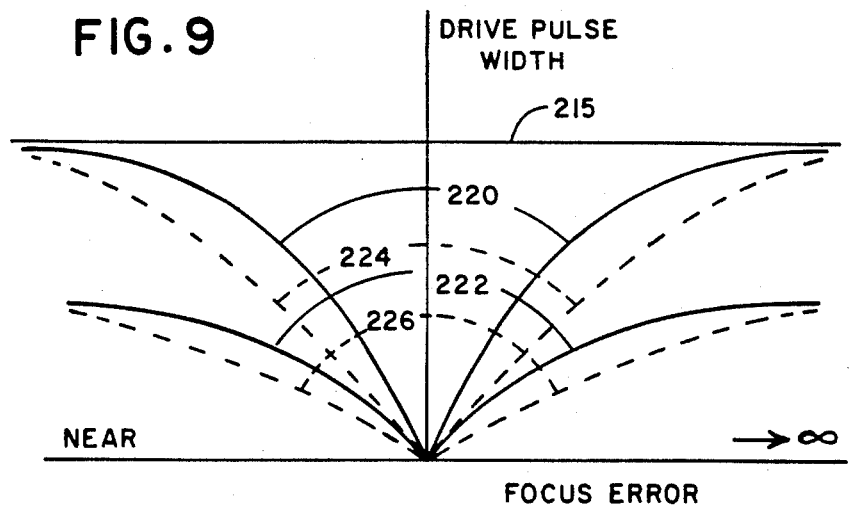
FIG. 9 shows drive pulse width varitions with focus error as circuit component values are changed.

Referring to FIG. 9, there is a graph showing how drive pulse widths vary with the focus error for various values of the capacitors 120 and 140 and resistor 135. The line 215 shows the maximum pulse width possible, i.e., the time between closing the sync switch 64 at time t7 and reopening it at time t9. Response curve 220 shows a system which has a large pulse width and thus a high but relatively uniform motor drive rate for large focus errors with decreasing pulse width and slower drive rate as the focus error decreases towards zero. A system having this kind of curve may be obtained by increasing the discharge timing resistor 135 and decreasing capacitors 120 and 140. In this case, for large errors the drive pulse width may be terminated by the opening of the sync switch 64.

Response curve 222 gives a smaller pulse width and a slower motor drive rate than curve 220 for all focus errors but still give a relatively constant drive for large focus erros. A system having this kind of response may be obtained by reducing the value of the discharge timing resistor 135 from that in the case described with respect to response curve 220. Response curves 220 and 222 give rapid response for large errors and good system accuracy.

Respone curves 224 and 226 show the changes that curves 220 and 222 would undergo, respectively, for increased value of capacitors 140 and 120.

Figure 10:
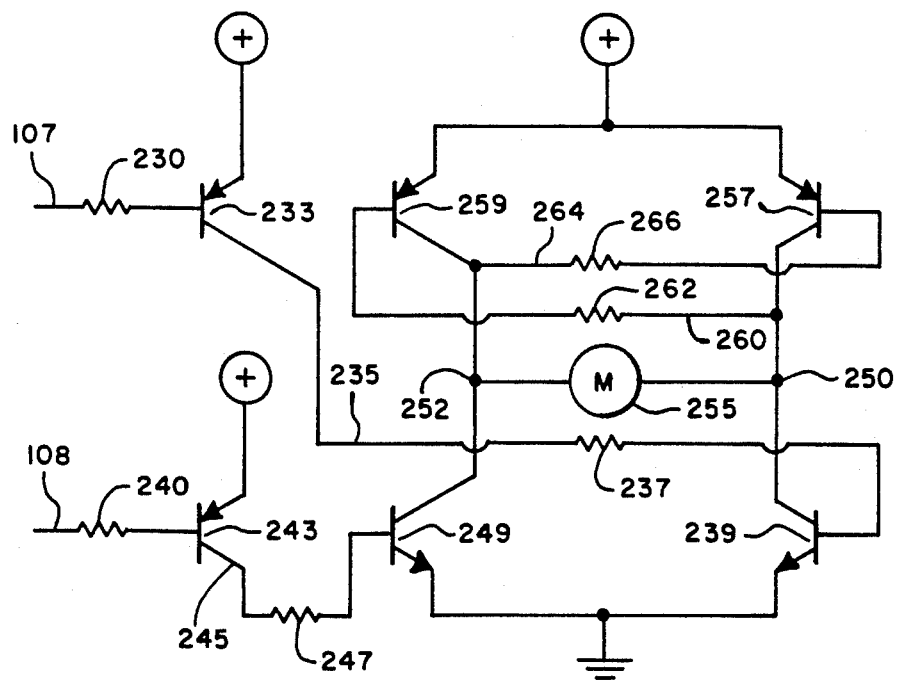
FIG. 10 shows a motor control circuit.

In FIG. 10, a circuit for controlling the lens drive motor is shown. On the left side of FIG. 10, conductors 107 and 108 are the same as the conductors at the outputs of NAND gates 100 and 102 of FIG. 7. Conductor 107 is connected through a resistor 230 to the base of a PNP transistor 233 having its emitter connected to the source of supply voltage. The collector of transistor 233 is connected by a conductor 235 and a resistor 237 to the base of an NPN transistor 239 having its emitter connected to ground.

Conductor 108 is connected through a resistor 240 to the base of a PNP transistor 243 having its emitter connected to the source of supply voltage. The collector of transistor 243 is connected by a conductor 245 and a resistor 247 to the base of an NPN transistor 249 having its emitter connected to ground. The collectors of transistors 239 and 249 are connected to junction points 250 and 252, respectively, and the lens drive motor 255 is connected between junction points 250 and 252.

Junction points 250 and 252 are also connected to the collectors of two PNP transistors 257 and 259, respectively, and the emitter of these transistors are connected to the source of supply voltage. The collector of transistor 257 is connected by a conductor 260 and a resistor 262 to the base of transistor 259 while the collector of transistor 259 is connected by a conductor 264 and a resistor 266 to the base of transistor 257.

The circuit of FIG. 10 operates upon the occurrence of a "0" signal on either conductor 107 or conductor 108. Assuming a "0" signal on conductor 107, transistor 233 will be placed in a conductive state thus causing the voltage on the collector thereof to become positive. The positive signal on the collector of transistor 233 is presented through resistor 237 to the base of transistor 239, thereby causing transistor 239 to become conductive. When transistor 239 becomes conductive, junction point 250 is placed near the ground potential as is the base of transistor 239 via conductor 260 and resistor 262 thereby causing transistor 259 to become conductive. When transistor 239 is on, junction point 252 becomes positive and it is seen that the current will flow through motor 255 in a first direction, i.e., from junction point 252 to junction point 250 using plus to minus current flow convention. This will cause the motor 255 to turn in a first direction which in connection with FIG. 7 will be from near to far.

While there is a "0" on conductor 107, there is a "1" on conductor 108, in which case transistor 243 is nonconductive and with no positive signal on the collector of transistor 243, transistor 249 is also non-conductive. Likewise, when transistor 259 is made conductive, a positive bias signal from the collector thereof is passed through resistor 266 to the base of transistor 257 thereby asuring that it will be in an off condition.

In the event that conductor 108 were to have a "0" thereon, then this signal through resistor 240 to the base of transistor 243 would cause transistor 243 to become conductive. The resulting positive signal from the collector of transistor 243 through resistor 247 to the base of transistor 249 causes transistor 249 to become conductive. When transistor 249 is conducting, junction point 252 is placed near ground potential as is transistor 257 via conductor 264 and resistor 266 thereby causing transistor 257 to become conductive. When transistor 257 is on, junction point 250 becomes positive and it is seen that current will flow through motor 255 in a second direction, i.e., from point 250 to junction point 252, using the same plus to minus convention for current flow. This will cause motor 255 to drive in the opposite direction which in connection with FIG. 7 will be from far to near. Of course, when conductor 108 has a "0" thereon, conductor 107 has a "1" thereon, in which case transistor 233 is off and the base of transistor 239 will no longer be positive, thereby turning it off. Likewise, when transistor 257 is conducting, the positive signal on its collector is passed through resistor 262 to the base of transistor 259, thereby turning it off also.

It is seen that the apparatus of FIG. 10 operates upon the occurrence of a "0" signal on line 107 to drive motor 255 in a near to far manner and upon the occurrence of a "0" on line 108, to drive motor 255 in a far to near manner.

Referring to FIG. 7, in an actual embodiment of the present invention, the following circuit components may have the following values:

$C_h$ 1.0 uf
$D_2$ IN4148
R63 100 K ohm
Supply voltage 5 volts
R68 100 K ohm
NAND 70 - CD 4011 (RCA)
NAND 72 - CD 4011 (RCA)
Inverter 73 - CD 4049 (RCA)
NOR 80 - CD 4001 (RCA)
NOR 82 - CD 4001 (RCA)
NOR 90 - CD 4001 (RCA)
NOR 91 - CD 4001 (RCA)
NAND 100 - CD 4011 (RCA)
NAND 102 - CD 4011 (RCA)
NOR 106 - CD 4001 (RCA)
Inverter 110 - CD 4049 (RCA)
R111 - 20 K ohm
Transistor 113 2 N 4400
OP AMP 115 CA 3130 (RCA)
R 117 - 100 K ohm
C120 - 0.1 uf
Inverter 125 - CD 4049 (RCA)
R127 - 20 K ohm
Transistor 130 - 2 N 4400
R135 - 100 K ohm
C140 - 0.1 uf
R145 - 10 K ohm
Transistor 147 - 2 N 4400
OP AMP 150 - CA 3130 (RCA)
R155 - 20 K ohm
Transistor 157 - 2 N 4400
R160 - 10 K ohm
Transistor 163 - 2 N 4248
R165 - 100 K ohm
OP AMP 170 - CA 3130 (RCA)
R181 - 1 K ohm
R182 - 1 K ohm It is thus seen that I have provided a unique continuous focus proportional control system in which it is possible to provide for fast response for large errors and slower response for small errors. Many changes will occur to those skilled in the art and I do not intend to be limited by the description used in connection with the preferred embodiment. I intend to be limited only by the appended claims.

I claim:

1. In an optical system including lens means and drive means for moving the lens means, an automatic focus system comprising:
    range sensing means for providing a time varying first signal having first and second states, the last transition of the first signal from the first to the second state being indicative of a position of proper focus;
    a signal source;
    signal storage means;
    first switch means connected to said range sensing means and operable in accordance with the first signal to connect said signal source to said signal storage means upon the occurrence of the last transition whereby said signal storage means thereafter stores a second signal derived from said signal source and of magnitude which varies with the time of occurrence of the last transition; and
    means connecting the signal storage means to the drive means to cause the drive means to move the lens mean toward the position of proper focus at a rate which depends upon the magnitude of the second signal.

2. In an optical system including lens means movable to produce a focused image of an object in a field of view, drive means for moving the lens means, scanning means movable between first and second positions to transmit radiation from the field of view, synchronizing means connected to the scanning means to produce an output signal when the scanning means reaches the second position and range sensing means connected to the scanning means and providing a time varying signal which changes between first and second states when the scanning means is at a position indicative of proper focus of the object, an automatic focus system comprising:
    signal source means;
    signal storage means;
    first switching means connected to said range sensing means and to said synchronzing means and operable to connect said signal storage means to said signal source means upon the occurrence of a change in the time varying signal from the first to the second states and to disconnect said signal storage means from the signal source means upon the occurrence of an output signal, said signal source means being operable to collect and store a signal the magnitude of which depends upon the time the signal storage means is connected to the signal source means; and
    second switching means connected to the synchronizing means, and operable to connect the signal storage means to the drive means upon the occurrence of the output signal.

3. Apparatus according to claim 2 wherein means connected to said signal storage means and operable upon the occurrence of the output signal to discharge the signal on the signal storage means for a period of time which varies with the magnitude of the signal stored.

4. Apparatus according to claim 3 wherein the drive means operates at a speed which depends upon the length of time it receives a signal from the signal storage means.

5. Apparatus wherein the signal storage means is a capacitor.

6. In an optical system including lens means movable to various positions so as to produce a focused image of an object located anywhere from a near location to a far location in a field of view, scanning means for transmitting radiation from the field of view including the near and far locations and locations therebetween by scanning from first position to a second position and then returning, relative position sensing means for providing a first signal having a first state when the scanning means is scanning a portion of the field of view that is on one side of the location in the field of view where the lens means is focused and a second state when the scanning means is scanning a portion of the field of view that is on the other side of the location in the field of view where the lens means is focused, synchronized means for providing a second signal having a first state when the scanning means is scanning from the first position to the second position and a second state when the scanning means is returning, range sensing means connected to scanning means and providing a time varying third signal which changes between first and second states while the scanning means is scanning from the first position to the second position, the last change of the third signal from the first state to the second state being indicative of a position of proper focus of the object, and drive means for moving the lens means, an automatic focus system comprising:
- supply signal source means for supplying a fourth signal of predetermined magnitude;
- reference signal source means for supplying a fifth signal of a predetermined magnitude which is less than the magnitude of the fourth signal;
- first signal storage means;
- second signal storage means;
- first switching means connected to said relative position sensing means and to said range sensing means operable when the first signal is in the first state to connect said first reference signal source means to said first signal storage means when the third signal is in the first state so that the first signal storage means stores a signal of magnitude derived from the fifth signal;
- second switching means connected to said relative position sensing means and to said range sensing means operable when the first signal is in the first state to connect said supply signal source to said first signal storage means to that upon the occurrence of a change in the third signal from the first state to the second state the signal stored by first signal storage means increases with time toward the magnitude of the fourth signal;
- third switching means connected to said relative position sensing means operable when the first signal is in the second state to connect the supply signal source to said second signal storage means so that during the time the first signal is in the second state, the signal stored by said second signal storage means increases with time toward a magnitude of the fourth signal;
- fourth switching means connected to said relative position sensing means and to said range sensing means operable when the first signal is in the second state to connect the first signal storage means to the second signal storage means when the third signal changes from the second state to the first state and to disconnect the first signal storage means from the second signal storage means when the third signal changes from the first state to the second state, the signal stored by said first signal storage means upon the last change of the third signal from the first state to the second state of being of magnitude indicative of the position of proper focus of the object; and
- fifth switching means connected to the relative position sensing means and to the synchronized means operable when the second signal is in the second state to connect the first signal storage means to the drive means, the drive means driving the lens in a first direction when the first signal is in the first state and in a second direction when the first signal is in the second state and at a speed which varies with the magnitude of the signal stored by said first signal storage means.

* * * * *